June 18, 1940.　　　G. K. NEWELL　　　2,204,815
LOAD BRAKE APPARATUS
Filed March 31, 1939　　　2 Sheets-Sheet 2
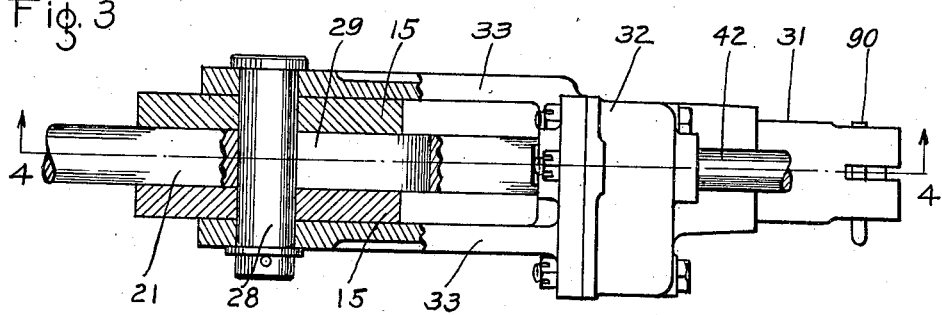
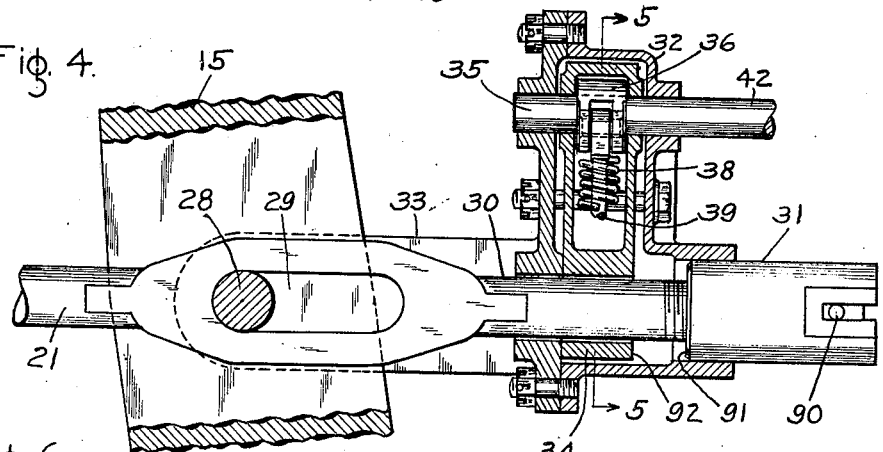
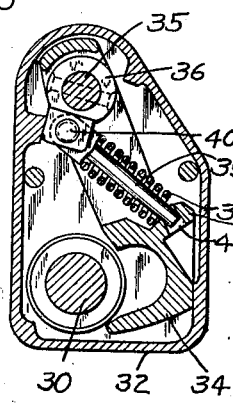
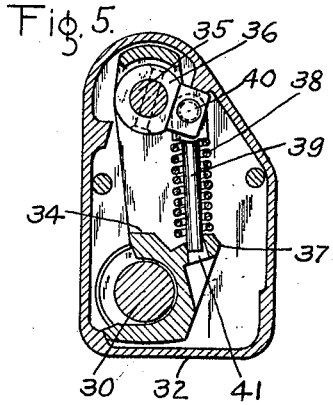
INVENTOR
GEORGE K. NEWELL
BY
ATTORNEY Patented June 18, 1940

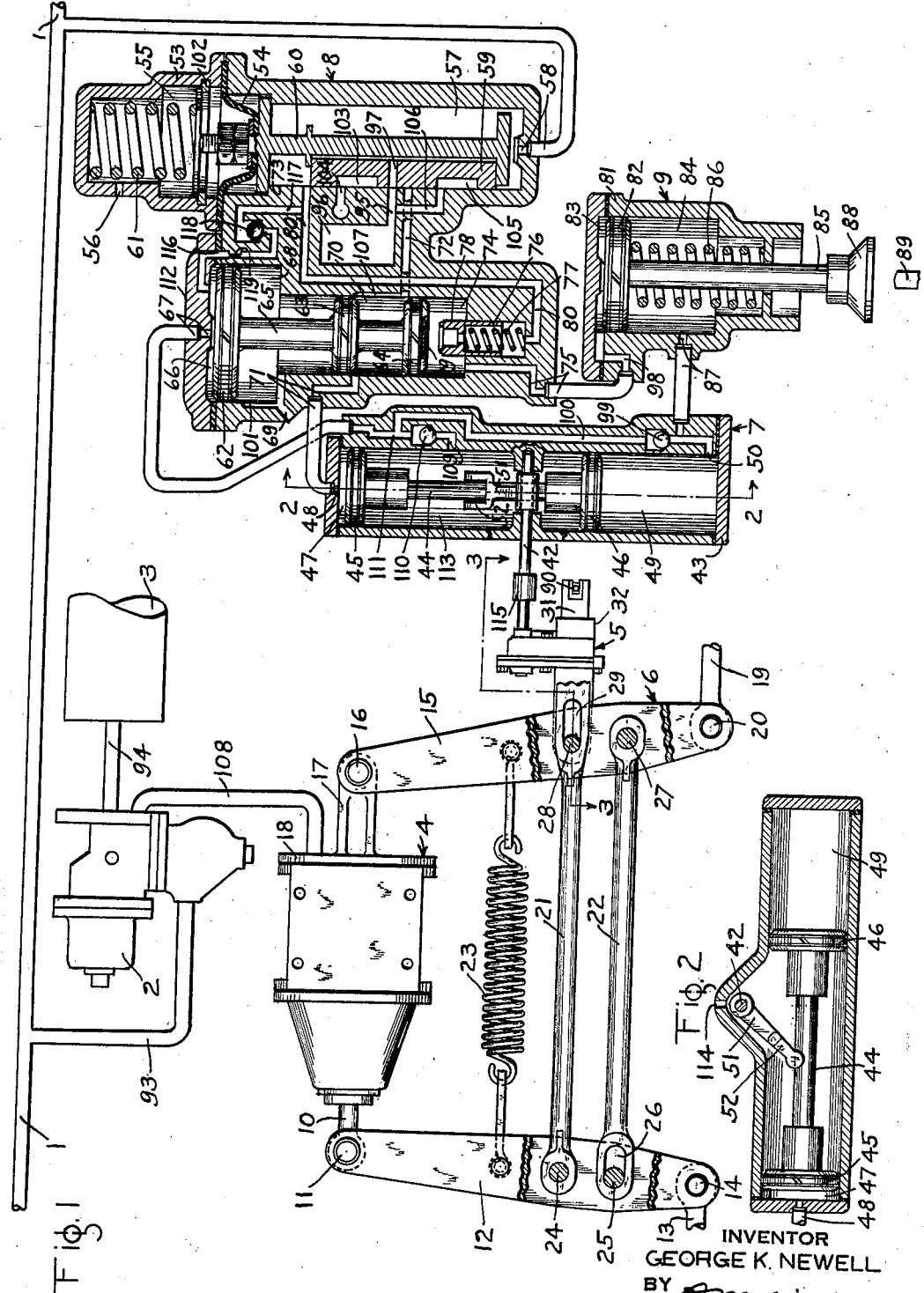

2,204,815

UNITED STATES PATENT OFFICE 2,204,815

LOAD BRAKE APPARATUS

George K. Newell, Pitcairn, Pa., assignor to The Westinghouse Air Brake Company, Wilmerding, Pa., a corporation of Pennsylvania Application March 31, 1939, Serial No. 265,246

13 Claims. (Cl. 303—22)

This invention relates to empty and load brake equipment for vehicles and more particularly to a fluid pressure empty and load brake equipment of the type which is adapted to be automatically changed over or conditioned for either empty or load braking according to variations in the weight of lading carried by the vehicle.

A principal object of the invention is to provide an improved empty and load brake equipment of the above mentioned type.

Various means have heretofore been devised for modifying the force with which the brakes may be applied on the cars throughout a train in order to avoid the possibility of locking of the wheels by the brake shoes. In some cases the braking force may be adjusted according to whether or not the car is empty or loaded, by shifting the fulcrum of the brake cylinder lever or by manually operated means operative from one side of the car, and in either case still maintain substantially the same piston travel, so as to maintain substantially the usual relationship between the pressure obtained in the brake cylinder and the reduction in brake pipe pressure.

Due to neglect or failure of the trainman to properly set the load adjustment control, the brakes on an empty car may be adjusted for loaded car control. As a result of this, wheel sliding in transit is quite probable during a brake application. If the equipment of a loaded car is adjusted for empty car operation the car is considerably under-braked.

Another object of the invention is to provide an improved and reliable automatic change-over mechanism which may readily and economically be combined with a brake equipment to convert said equipment into an automatic empty and load brake equipment and thus avoid the dangers just mentioned.

A further object of the invention is to provide a fluid pressure empty and load brake equipment which is adapted to be automatically changed over or conditioned for either empty or load braking and in which a brake controlling valve device of the type in common use, such for instance as the well known "K" or "AB" triple valve devices (which were designed for a single capacity fluid pressure brake equipment), may be employed without any change in either the construction or operating characteristics of either device.

A further object of the invention is to provide an improved and simplified empty and load change-over mechanism which, when the brake pipe pressure is being increased in initially charging the equipment, will be automatically adjusted to condition the equipment for either empty or load braking, depending upon the weight carried by the body of the vehicle, and which, when the brake pipe exceeds a predetermined limit, will be maintained in its adjusted position so long as the brake pipe pressure does not reduce below said predetermined limit. This change-over mechanism is particularly intended for use with an empty and load brake apparatus in which a single brake cylinder is associated with an auxiliary reservoir and a triple valve device of the type in common use, and in which the braking force may be adjusted by shifting the fulcrum of the brake cylinder levers so as to provide a higher leverage ratio for a loaded car than for an empty car.

Other objects and advantages will appear in the following more detailed description of my invention.

In the accompanying drawings, Fig. 1 is a diagrammatic view, the major portion of which is shown in section, of an empty and load fluid pressure brake equipment constructed in accordance with the invention; Fig. 2 is a longitudinal sectional view of the change-over engine taken on the line 2—2 of Fig. 1; Fig. 3 is a plan view, partly in section and on enlarged scale, of a portion of the brake mechanism shown in Fig. 1, the sectional portion being taken on the line 3—3 of Fig. 1; Fig. 4 is an enlarged sectional view taken on the line 4—4 of Fig. 3; Fig. 5 is a sectional view taken on the line 5—5 of Fig. 4 showing the mechanism in one of its operating positions; Fig. 6 is a sectional view taken on the line 5—5 of Fig. 4 showing the mechanism in its other operating position.

As shown in Fig. 1 of the accompanying drawings, the empty and load fluid pressure brake equipment may comprise a brake pipe 1, a brake controlling valve device 2, an auxiliary reservoir 3, a brake cylinder 4, a mechanism 5 for changing the lever ratio of the brake rigging 6, a change-over engine 7 for operating the mechanism 5, an adjustment control valve device 8 for controlling operation of the engine 7, and a strut cylinder mechanism 9 for controlling the operation of the valve device 8.

The brake controlling valve mechanism 2 shown is of the "K" type, but may be of any other desired type. This mechanism may be of substantially the same construction and have the same operating characteristics as the "K" triple valve fully described in Westinghouse Air Brake Company's Instruction Pamphlet No. 5030, and in view of this it is deemed unnecessary to show and describe the mechanism in detail. It will of course be understood that this mechanism operates upon a service rate of reduction in brake pipe pressure to supply fluid under pressure from the auxiliary reservoir 3 to brake cylinder 4 to effect a service application of the brakes, and to supply fluid at an emergency rate to effect an emergency application of the brakes upon a reduction in brake pipe pressure at an emergency rate; and further, upon an increase in brake pipe pressure to effect a release of the brake and charging of the braking equipment.

Associated with the brake cylinder 4 are the usual live and dead brake cylinder levers 12 and 15, respectively. One end of the live lever is operatively connected by means of a pin 11 to the outer end of the brake cylinder push rod 10, and the corresponding end of the dead lever is pivotally fulcrumed by means of a pin 16 to a lug 17 which projects outwardly from the pressure head 18 of the brake cylinder. The other end of the live lever 12 is operatively connected by means of a pin 14 to a pull rod 13 which is operatively connected in the usual manner to the brake rigging of one truck of a car, while the corresponding end of the dead lever 15 is operatively connected by means of a pin 20 to a pull rod 19 which is operatively connected to the brake rigging of the other truck. The live and dead levers may be identical with each other and for illustrative purposes has been shown as comprising a pair of identical spaced parallel extending and connected members.

Located intermediate the length of the levers 12 and 15 and extending across the space between them are spaced parallel tie rods 21 and 22, which are effective, one at a time, as desired to operatively connect said levers 12 and 15. The tie rod 21 is adapted to be effective when it is desired to provide a relatively low leverage ratio, as for an empty car, and the tie rod 22 is adapted to be effective when it is desired to provide a higher leverage ratio, as for a loaded car. The levers 12 and 15 are also connected by the usual brake rigging release spring 23.

The tie rod 21 is operatively connected to the live cylinder lever 12 by means of a fulcrum pin 24, and the tie rod 22 is adapted to be operatively connected to the same lever by means of a fulcrum pin 25, and engaging the tie rod 22 within a longitudinal slot 26 in the tie rod 22. The fulcrum pin 25 is disposed at a greater distance from the push rod pin 11 than is the fulcrum pin 24. The opposite end of the tie rod 22 is operatively connected to the dead cylinder lever 15 by means of a fulcrum pin 27, and the tie rod 21 is adapted to be operatively connected to the same lever by a pin 28 engaging the tie rod 21 within a longitudinal slot 29 in the tie rod 21. This tie rod is provided with an extension 30 which extends to the right of the slotted opening 29, and which is screw-threaded to receive an adjustable stop 31.

For rendering one or the other of said tie rods 21 and 22 effective, the mechanism 5 is loosely mounted on the extension 30 of the tie rod 21. As best seen in Figs. 3 to 5, this mechanism comprises a casing 32 through which the extension 30 of the tie rod 21 is adapted to pass, with the stop 31 at the end of the rod extending to the right beyond the casing and so arranged that the extension 30 on the rod serves as a guide for the casing. The casing at its opposite side is provided with a pair of spaced lugs 33 between which passes the dead cylinder lever 15, which is operatively connected thereto by the fulcrum pin 28 passing through both members of the fork 33, as is shown in Fig. 3 of the drawings.

Contained in the casing 32 is a finger 34 pivotally mounted at one end on a shaft 35 to which is fixed a crank 36 for operating the finger. Also contained in the casing and interposed between and operatively engaging the crank 36 and a projection 37 on the finger 34 is a compression spring 38 mounted on a centering rod 39. The rod 39 is connected at one end to the crank 36 by a pin 40 and is at its opposite end adapted to move in a slot 41 of the projection 37.

The shaft 35 is connected to an extension 42 through a universal joint device 115 which is arranged to provide for some lateral movement of shaft 35 with respect to the extension 42. The extension 42 extends into the change-over engine 7, as shown. The change-over engine 7 comprises a casing 43 in which the extension 42 of the shaft 35 is rockably journaled.

Associated with the extension 42 of the shaft 35 is a double acting plunger 44, having a piston 45 at one end and a piston 46 at the opposite end which is mounted in the casing to move at right angles to the axis of the shaft. Secured to the shaft 42 is an operating arm 51 which at one end is provided with a jaw 52 which is operatively connected to the plunger 44 intermediate its ends between the pistons 45 and 46. At one side of the piston 45 is a chamber 47 which is open to a passage 48, and at one side of piston 46 is a chamber 49 which is open to a passage 50. Between the lower face of piston 45 and the upper face of piston 46 there is a chamber 113 which is open to the atmosphere by way of a port 114 in the casing, as viewed in Fig. 2 of the drawings.

For controlling operation of the change-over engine 7, the adjustment control valve device 8, as shown in Fig. 1 of the drawings, is provided. This valve device may comprise a selector valve device 112 which functions to effect conditioning of the change-over engine 7 for either empty or load braking, and a change-over control valve device 53 which functions to control the operation of the strut cylinder mechanism 9 and to effect the operation of selector valve device 112 to its loaded or empty braking position and to render the mechanism inoperative from one change-over position to the other so long as the brake pipe pressure is in excess of a predetermined limit, all of which will be hereinafter more fully described.

The change-over control valve device 53 may comprise a casing in which there is mounted a flexible diaphragm 54, at one side of which there is a chamber 55 constantly connected through a passage 56 with the atmosphere. At the opposite side of the diaphragm there is a valve chamber 57 which is constantly connected through a passage and pipe 58 to the brake pipe 1. Contained in this chamber is a slide valve 59 which is adapted to be operated by a stem or follower 60 operatively secured to the flexible diaphragm. Contained in the chamber 55 is a spring 61, which rests on one side of a disk supported by a ring 102 carried by the casing. The opposite side of the seat 102 engages the end of the stem 60 and thus the spring at all times is adapted to urge the diaphragm, stem and slide valve toward the position shown in Fig. 1.

The selector valve device 112 may comprise a casing which, in the present embodiment of the invention, is integral with the casing of the change-over control valve 53. Operatively mounted on this casing are differential pistons 62, 63 and 64 which are rigidly connected together by a stem 65. The piston 62 is of larger diameter than the pistons 63 and 64 and at its outer face there is a chamber 66 which, as will hereinafter more fully appear, is open to a passage 116 and is also connected through a passage and pipe 67 to the change-over engine 7. Between the lower face of piston 62 and the upper face of piston 63 there is a chamber 68 which is connected to the atmosphere by a passage 69. Between the lower face of piston 63 and the upper face of piston 65 there is a chamber 70 which is connected through a passage and pipe 71 to the change-over engine 7 and which is also open to a passage 72 leading to the seat 73 for the slide valve 59 in the change-over control valve 53. At the outer or lower face of piston 64 there is a chamber 74 which is connected through a passage and pipe 75 to the strut cylinder mechanism 9.

Extending into the chamber 74 is a movable valve 76 subject to the pressure of a spring 77 and provided with a seat rib 78 through which the chamber 74 is open to a passage 80 leading to the slide valve seat 73 of the change-over control valve 53.

A gasket 79 is provided at the outer or lower face of piston 64 which is adapted under certain conditions to engage the seat rib 78 to effect a leak-proof seal between passage 80 and chamber 74.

The strut cylinder mechanism 9 may comprise a vertically disposed cylinder casing 81 mounted on a sprung portion of the vehicle structure, not shown. Contained in the cylinder casing is a piston 82 having at one side a chamber 83 which is in constant communication with the aforementioned pipe 75 and having at the other side a chamber 84 which is connected to a pipe 87 which leads to the change-over engine 7. This chamber is also constantly connected to the atmosphere by way of clearance space which may be provided between the non-pressure head of the cylinder casing and a push rod 85 secured to the piston 82. Contained in the non-pressure chamber 84 is a coil spring 86 which, at all times, tends to move the strut cylinder piston 82 to its normal or upper position, in which it is shown in Fig. 1. With the piston 82 in this position the pipe 87 is consequently connected to the atmosphere.

At the end of the push rod 85 there is a foot 88 which is adapted to be moved into contact with a stop 89 carried by the truck spring plank, or other unsprung truck part, to limit the outward movement of the piston 82 according to the weight carried by the car body.

It will be understood that when adjusting the apparatus the adjustable stop 31 on the tie rod extension 30 will be adjusted and then locked by means of a split pin 90 (see Figs. 3 and 4) in a position so that when a brake application is made on an empty car the play or distance between the inner end 91 of the stop 31 and the outer edge 92 of the finger 34 will just be taken up when the brake shoes come into contact with the wheels.

In most instances the empty and load change-over apparatus will be so adjusted as to assume load position when the car is loaded to slightly more than half of its capacity and to assume empty position when the car is loaded to less than half of its capacity.

According to the invention, the equipment is adapted to be conditioned for either empty or load service when the equipment is being initially charged with fluid under pressure, as will hereinafter more fully appear in the following description of the operation of the equipment.

*Automatic change-over operation of the equipment on an empty car*

Assuming the equipment to be at atmospheric pressure, the diaphragm 54 of the change-over control valve 53 will be caused to flex downwardly by the opposing action of the spring 61 and thus acts through the medium of the stem 60 to shift the slide valve 59 to the position shown in Fig. 1.

In initially charging the equipment, fluid under pressure supplied to the brake pipe 1 flows through branch pipe 93 to the several chambers of the brake controlling valve device which are to be charged and to the auxiliary reservoir 3, respectively, in the usual manner.

Fluid under pressure supplied to the brake pipe 1 also flows through branch pipe 58 to chamber 57 of the change-over control valve 53. With the change-over control slide valve 59 in its illustrated position, fluid under pressure flows from the valve chamber 57 through port 97 in slide valve 59 to passage 95 which leads to a volume reservoir 96, which in the present embodiment of the invention is defined by the casing. Fluid under pressure also flows from the chamber 57 to a passage 80, and to a connected passage 117 but is prevented from flowing to passage 116 leading to chamber 66 of the selector valve 112 by means of a ball check valve 118. The purpose of the communication between said chamber and passage 80 will hereinafter more fully appear. Fluid under pressure in chamber 80 flows from thence through valve 76 to chamber 74 of the selector control valve 112. If the piston 64 happens to be in a position where the gasket 79 is seated on the seat rib 78, when fluid pressure is supplied to passage 80, the piston 64 is moved out of engagement with the seat rib 78, by the fluid pressure acting on that portion of the piston 64 defined by the seat rib 78. Fluid under pressure flows from the valve chamber 74 to passage and pipe 75 and from thence to the strut piston chamber 83 by way of a passage 98. When the pressure of fluid in the piston chamber 83 has been increased to about thirteen pounds the piston 82 and thereby the push rod 85 will be caused to move downwardly against the opposing pressure of the spring 86. The push rod is thus moved until the foot member 88 engages the stop member 89.

Since the car is empty, the strut piston 82 will have moved far enough to connect the passage and pipe 87 to the chamber 83 before the foot 89 of the piston rod 85 engages the stop member 89. Fluid under pressure now flows from the strut piston chamber 83 through pipe and passage 87 to the passage 50 in the change-over engine 7, and from thence to plunger chamber 49. Fluid under pressure in passage 50 also flows past ball check valve 99 to passage 100 and from thence to the pipe and passage 67 leading to the selector valve piston chamber 66.

The fluid pressure acting in chamber 49 of the change-over engine 7 will cause the piston 46 with rigidly connected piston 45 and plunger 44 to readily move upwardly to the position in which they are shown in Fig. 1 of the drawings, as there is no opposing pressure in chamber 47. Further, as the plunger 44 is thus moved it causes the arm 51 to rock the shaft extension 42 and thereby the shaft 35 of the change-over mechanism 5. The shaft 35 rocks the crank 36 to cause the finger 34 to move into engagement with the extension 30 of the tie rod 21, as shown on Fig. 5 of the drawings. The parts are thus positioned for empty car braking.

The fluid pressure in the piston chamber 66 acting on the face of the large piston 62 will move the piston assemblage downwardly against the opposing fluid pressure in the chamber 74 acting on the face of the smaller piston 64 until the gasket 79 engages the seat rib 78 which thus provides a leak-proof seal between the passage 80 and the chamber 74. When this occurs the opposing action of the spring 77 and the brake pipe pressure supplied from chamber 57 acting on the piston 64 within the seat rib 78, plus the pressure in chamber 74 acting on the piston outside the seat rib 78, will be sufficient to arrest movement of the piston assemblage before a release groove 101 is opened by the large piston 62, so that when charging an empty car there will be no great loss of brake pipe pressure to the atmosphere by way of this groove. The purpose of this groove will hereinafter more fully appear. The selector piston assemblage may, of course, oscillate slightly but will eventually seek a balanced position in which chamber 66 is disconnected from groove 101 and piston 64 just rests on seat 78. In doing so some fluid under pressure might escape through the release groove 101 to the exhaust port 69, but this will be limited to fluid pressure already in the strut cylinder, change-over engine and connecting pipes and passages, which loss is not of great significance at this time.

At the same time fluid under pressure from chamber 66 will flow into passage 116 to the under side of check valve 118. However, fluid at the same pressure in passage 117 is acting on top of the check valve 118 so that it will remain closed.

Now, when the pressure of fluid in chamber 57 of the change-over control valve has been increased to around thirty pounds, the diaphragm 54 will be caused to flex upwardly against the opposing pressure of the spring 61. As it is thus flexed the diaphragm acts through the medium of the stem 60 to shift the slide valve 59 upwardly to its innermost position. In this position a cavity 103 in the slide valve connects the passage 80 to an atmospheric passage 104. At the same time a cavity 105 in the slide valve connects the passage 72 with a passage 106 leading to the volume reservoir 96. With these connections thus established, fluid under pressure flows from the connected volume reservoir 96 by the circuit just traced to the piston chamber 70 between the selector valve pistons 62 and 63. Since the selector piston assemblage is in the aforementioned balanced position in which the gasket 79 engages the seat rib 78, a feed groove 107 connects the chamber 70 to the chamber 68 which is open to the atmosphere.

With the passage 80 connected to the atmosphere the pressure acting on the outer face of piston 64 within the seat rib 78 will be vented and the fluid pressure in chamber 66 acting on the face of the larger piston 62 will move the piston assemblage downward against the opposing fluid pressure acting on the piston outside the seat rib 78 and the spring 77 acting on the face of the smaller piston 64. When this occurs the chamber 66 will be connected to the atmosphere by way of release groove 101, chamber 68 and passage 69. Then, due to this connection, chamber 74 at the outer face of piston 64, the strut cylinder piston chamber 83 and the chamber 49 at the outer face of piston 46 in the change-over engine 7 will be connected to the atmosphere. At the same time, passage 117 is vented since it is connected to passage 80, so that fluid under pressure in chamber 66 is also permitted to flow to the atmosphere at a restricted rate by way of choke 119, passage 116, past ball check valve 118 to passage 117. When due to the release flow which follows, the fluid pressure in strut piston chamber 83 has been reduced below the value of the spring 86 (thirteen pounds), said spring acts to move the piston 82 to its uppermost position, as shown in Fig. 1. After it has moved a short distance toward its uppermost position, the piston first cuts off the communication between the piston chamber 83 and the passage 87 and then connects the passage 87 to the spring chamber 84 and consequently to the atmosphere, so that fluid under pressure is now vented from the piston chamber 49 of the change-over engine valve device 7 by way of passage 50, pipe and passage 87 and spring chamber 84. It will here be noted that the pressure in chamber 66 and the connected pipe 67 and passage 100 will reduce to the atmosphere by way of passage 116, past ball check 118, passages 117 and 80, cavity 103 and passage 104. When the pressure in chamber 66 has been reduced to some value below the pressure in chamber 74 the piston 64 will be caused to move upward. When this occurs the seal between the gasket 79 and the seat rib 78 is broken, thus opening a communication from the chamber 74 to the atmosphere. Due to this communication the remaining pressure in strut cylinder chamber 83 and the chamber 74 will be vented to the atmosphere by way of passage 80.

With the apparatus in empty position and the several parts in the positions as just described, the brake cylinder 4 is connected to the atmosphere by way of pipe 108 and through the brake control valve device 2 in the usual manner.

*Application of the brakes with the equipment conditioned for empty car operation*

When it is desired to effect an application of the brakes the pressure of fluid in the brake pipe is reduced in the usual manner, causing the brake controlling valve device 2 to function to supply fluid under pressure from the auxiliary reservoir 3 to the pipe 108. Fluid under pressure thus supplied to the pipe 108 flows to the brake cylinder, causing the push rod 10 to move outwardly, that is, toward the left, as viewed on Fig. 1 of the drawings. This causes the live cylinder lever 12 to rock in a counterclockwise direction about the fulcrum pin 25 which engages the tie rod 22 at the outer end of the opening 26.

The cylinder lever 12, as it is thus moved, shifts the pull rod 13 toward the right so as to effect the operation of the usual track brake rigging (not shown) at one end of the vehicle, and at the same time acting through the medium of the pin 25 and the rod 22 causes the lever 15 to rock in a clockwise direction about its fulcrum 16 so as to move the pull rod 19 toward the left to effect operation of the truck brake rigging at the opposite end of the vehicle. Due to the slotted opening 29 accommodating the pin 28, movement of lever 12 shifts the tie rod 21 relative to the fulcrum pin 28 and lever 15 in the direction toward the left hand until the end 91 (see Fig. 4) of the adjustable stop 31 engages the outer end of the finger 34, now in the position shown in Fig. 5. When this occurs continued movement of the push rod 10 causes the lever 12 to rock about the fulcrum pin 24 and operatively connect the lever 15 to the lever 12 by the tie rod 21. The force thus applied to the rod 21 urging it to the left is transmitted to dead lever 15 through the rod extension 30, the stop 31 thereon, casing 32, arms 33 on the casing, and pin 28 passing through the dead lever 15. The tie rod 22 is automatically rendered ineffective, because the pin 25 moves freely in the opening 26. Now, as the push rod 10 continues to move outwardly the brake shoes are applied against the car wheels, in the usual well known manner, with a brake force transmission that takes place through the tie rod 21, that is, through the low lever ratio.

The pressure of fluid in chamber 57 acting on the diaphragm 54 of the change-over control valve is reduced with the pressure in the brake pipe, during a brake application, but said pressure is not reduced below the value of the opposing pressure of the spring 61, so that the pressure in chamber 57 maintains the diaphragm, and hence the diaphragm follower 60 and the slide valve 59, in the position described under change-over operation of the equipment on an empty car.

*Release of brakes with the equipment conditioned for empty car operation*

When it is desired to effect the release of the brakes the brake pipe pressure is increased in the usual manner, causing the brake controlling valve device 2 to function to establish communication from the pipe 108 and consequently from the brake cylinder 4 to the atmosphere. The control valve also functions to supply fluid under pressure from the brake pipe to the pipe 94 and consequently to the auxiliary reservoir. Fluid under pressure supplied to the brake pipe 1 also flows through pipe 58 to chamber 57 of the change-over control valve, thus reestablishing brake pipe pressure in said chamber.

When the fluid under pressure is vented from the brake cylinder 4 the push rod 10 is moved into the cylinder and the levers 12 and 15 assume the position shown in Fig. 1 of the drawings, thus releasing the brake shoes from the vehicle wheels in the usual manner, by means of pull rods 14 and 19.

*Automatic change-over operation of the equipment on a loaded car*

When the car is carrying a load of more than half of its capacity the distance between the outer end of the foot 88 of the strut cylinder piston rod 85 and the upper end of the stop 89, due to the compression of the truck springs, will be such that when fluid under pressure is supplied by way of passage 80, chamber 74, passage and pipe 75 and passage 98 to the piston chamber 83 of the strut cylinder 9 in initially charging the equipment, the foot 88 will engage the stop 89 and thereby bring the piston 82 to a stop before it can uncover the port 87 leading to the passage 50 in the change-over engine. The piston 82 in this position will not close communication from the port 87 to the spring chamber 84, so that the piston chamber 49 of the change-over engine device 7 remains connected to the atmosphere.

Now when the pressure in chamber 57 of the change-over control valve has been increased to about thirty pounds, the diaphragm 54 flexes and causes the slide valve 59 to be shifted to its position opposite to that shown in Fig. 1. In this position the cavity 103 connects the passage 80 to the passage 104 leading to the atmosphere, so that fluid under pressure is vented from the chamber 74 in the selector control valve and from the strut cylinder piston chamber 83. With the slide valve 59 in this position the cavity 105 connects passage 106 to the passage 72, and thus fluid under pressure is supplied from the volume reservoir 96 to the selector valve chamber 70 between pistons 63 and 64, which are in the position shown in Fig. 1 by reason of fluid under pressure acting on the outer or lower face of piston 64 during the initial charging. Fluid under pressure thus supplied to chamber 70 flows by way of passage and pipe 71 to the port 48 leading to chamber 47 of the change-over engine 7.

The fluid pressure acting in chamber 47 will cause the plunger 44 with its rigidly connected pistons 45 and 46 to move downwardly against the opposing atmospheric pressure in chamber 49. As the plunger 44 is thus moved it causes the arm 51 to rock the extension 42 and thereby the shaft 35 of the change-over mechanism 5. The shaft 35 rotates the crank 36 to cause the finger 34 to move out of engagement with the extension 30 of the tie rod 21, as shown on Fig. 6 of the drawings. When the plunger 44 has moved far enough to cause the finger 34 to assume this position the piston 45 of change-over engine 7 will have moved far enough to connect chamber 47 at the outer end of the piston with a port 109. Fluid under pressure now flows from the chamber 47 through port 109, past a check valve 110 into a passage 111 and from thence to passage 100 and pipe and passage 67 leading to the selector valve piston chamber 66. The fluid pressure in the piston chamber 66 acting on the face of the large piston 62 will move the piston assemblage downwardly against the opposing atmospheric pressure at the outer face of piston 64 until the gasket 79 engages the seat 78 of the valve 76. When this occurs continued downward movement of the piston assemblage will compress the spring 77 until the large piston 62 will have connected the chamber 66 at the outer face of piston with the chamber 68 at the inner face of said piston by release groove 101. With the selector piston assemblage in this position, fluid under pressure will flow from chamber 66 to chamber 68 and thence to the atmosphere by way of passage 69 so that fluid under pressure is now vented from the piston chamber 47 of the change-over engine valve device 7 by the circuit just traced and also by way of choke 119, passage 116, past ball check valve 118, passages 117 and 80, cavity 103 and passage 104.

With the apparatus in load position and the several parts in the positions as just described, the brake cylinder 4 is connected to the atmosphere, as before described, in the usual manner.

*Application of the brakes with the equipment conditioned for loaded car operation*

When the brake cylinder push rod 10 is moved outwardly and cylinder lever 12 is rotated about the fulcrum pin 25, in effecting an application of the brakes, the fulcrum pin 25 and the tie rod 22 become substantially immediately effective for taking up the slack in the rigging and applying the brake shoes against the car wheels. The tie rod 21 remains ineffective because there is sufficient clearance between the pin 28 and the outer end of the slot 29 to permit the tie rod 21 to move freely when the finger 34 is moved away from the extension 30, so that the end of the adjustable stop 31 can not engage the finger, as shown on Fig. 6 of the drawings.

Thus, it will be seen that when the apparatus is set for empty car braking, the tie rod 21 is effective after the brake cylinder push rod has moved outwardly a predetermined distance in effecting an application of the brakes, as determined by the clearance between the end of the adjustable stop 31 and the finger 34, the tie rod 22 remaining ineffective after this clearance has been taken up during the application. Also, when the apparatus is adjusted for loaded car braking, the tie rod 22 becomes substantially immediately effective upon outward movement of the push rod 10 through the medium of fulcrum pin 25, the tie rod 21 remaining ineffective.

It is evident that since the fulcrum pin 25 is disposed at a greater distance from the push rod than is the fulcrum pin 24 the leverage ratio provided by it is greater than when the pin 24 is effective as a fulcrum. In other words, with pin 25 effective as a fulcrum, a greater pull is applied to the pull rods 14 and 19, with a given pressure acting in the brake cylinder, than when the pin 24 is effective.

It will be seen from the foregoing that I have provided improved means for automatically shifting the fulcrum point of a brake cylinder lever so as to provide a higher leverage ratio for a loaded car than for an empty car and at the same time maintain a substantially uniform brake cylinder piston travel.

While one illustrative embodiment of my invention has been described in detail, it is not my intention to limit its scope to that embodiment or otherwise than by the terms of the appended claims.

Having now described my invention, what I claim as new and desire to secure by Letters Patent, is:

1. In a load brake apparatus having a member provided with two different control positions, and a fluid pressure system operative to effect an application of the brakes in accordance with the position of said member, in combination, an engine for effecting movement of said member to its different positions, a first communication through which fluid under pressure may be supplied to operate the engine to effect movement of said member to one of its two positions, a second communication through which fluid under pressure may be supplied to operate said engine to effect movement of said member to the other of its two positions, means responsive to the pressure of fluid initially supplied to charge the brake system for controlling supply of fluid under pressure to both of said communications, said means being operative below a predetermined pressure to supply fluid to one of said communications and operative above said predetermined pressure to supply fluid to the other of said communications, and means governed by the loaded condition of the vehicle for controlling the flow of fluid under pressure through one of said communications.

2. In a load brake equipment having a member provided with two different control positions, and a fluid pressure system operative to effect an application of the brakes in accordance with the position of said member, in combination, a brake pipe, an engine for effecting movement of said member to its different positions, a control valve device responsive to variations in brake pipe pressure for controlling the supply of fluid under pressure for effecting operation of said engine, a first passage through which fluid under pressure may flow from the control valve device to the engine to effect operation of said member to one of said positions, and a second passage through which fluid under pressure may flow to said engine for effecting operation of said member to its other position, means controlled by the weight of the material forming the load on the vehicle for controlling the supply of fluid under pressure which may flow through said first passage, and other means interposed in both said first and second passages for controlling the supply and release of fluid to and from said engine.

3. In a load brake apparatus having a member provided with two different control positions and a fluid pressure system operative to effect an application of the brakes in accordance with the position of said member, in combination, an engine for effecting movement of said member to its different positions, a first communication through which fluid under pressure may be supplied to the engine to cause it to move said member to one of its two positions, a second communication through which fluid under pressure may be supplied to the engine to cause it to move said member to the other of its two positions, means governed by the load on the vehicle for controlling the flow of fluid through one of said communications, and means governed by the pressure of the fluid in the system for also controlling the flow of fluid through said one communication and movable to another position for controlling the flow of fluid through the other communication.

4. In a load brake apparatus having a member provided with two different control positions and a fluid pressure system operative to effect an application of the brakes in accordance with the position of said member, in combination, an engine for effecting movement of said member to its different positions, a first communication through which fluid under pressure may be supplied to the engine to cause it to move said member to one of its two positions, a second communication through which fluid under pressure may be supplied to the engine to cause it to move said member to the other of its two positions, means governed by the load on the vehicle for controlling the flow of fluid through one of said communications, means governed by the pressure of the fluid in the system for also controlling the flow of fluid through said one communication and movable to another position for controlling the flow of fluid through the other communication, and means responsive to the pressure of fluid supplied in initially charging the system for controlling the operation of both of said two last mentioned means.

5. In an empty and load brake equipment for a vehicle, in combination, a first communication through which fluid under pressure is supplied to condition the brake equipment for producing one degree of braking, a second communication through which fluid under pressure is supplied to condition the brake equipment for producing a different degree of braking, a strut cylinder device operated according to the load on the vehicle for controlling one communication, a selector valve device operated by fluid pressure for controlling the other communication, and a control valve device for controlling supply of fluid under pressure to both of said communications, and being operative below a predetermined pressure of fluid in the system to supply fluid under pressure to one only of said communications and being operative above said predetermined pressure of fluid in the system to supply fluid under pressure to the other only of said communications.

6. In an empty and load brake equipment for a vehicle, in combination, a mechanism adapted to be positioned for providing a certain degree of braking and adapted to be differently positioned to produce a higher degree of braking, a change-over engine operative to one or the other of two control positions for effecting the conditioning of said mechanism, a brake pipe, a first communication, a second communication, a control valve device responsive to variations in brake pipe pressure and operative to supply fluid under pressure through said first communication when the brake pipe pressure is below a certain degree to effect operation of said engine to one of said positions and operative upon an increase above said certain degree to supply fluid under pressure through said second communication to effect movement of said engine to its other position, and valve means controlled by the weight of the material forming the load on the vehicle for selectively controlling the supply of fluid under pressure from the control valve for operation of the engine to one or the other of its two control positions.

7. In an empty and load brake equipment for a vehicle, in combination, a mechanism adapted to be positioned for providing a certain degree of braking and adapted to be differently positioned to produce a higher degree of braking, means operative according to the weight of the load carried by the vehicle for controlling the operation of said mechanism to one or the other of said conditioned positions, a reservoir, a brake pipe, a control valve device conditioned by fluid under pressure from the brake pipe in initially charging the equipment for controlling operation of said means, a slide valve included in said control valve device operative when the fluid pressure in the brake pipe is below a predetermined degree to charge said reservoir and to effect operation of said means to condition the mechanism for a certain degree of braking and operative when the brake pipe pressure is above said predetermined degree to supply fluid under pressure from said reservoir to effect operation of said means to condition the mechanism for said higher degree of braking.

8. In an empty and load brake equipment for a vehicle, in combination, a fluid pressure operated mechanism having two positions and operative in one position to provide for a certain degree of braking and operative in the other position to provide for a higher degree of braking, a first communication through which fluid under pressure is supplied to operate the mechanism to one of its two positions, a second communication through which fluid under pressure is supplied to operate the mechanism to the other of its two positions, a selector valve device for controlling one of said communications, and a strut cylinder device for controlling the other of said communications and being operative to open said other communication and at the same time to cause said selector valve device to close the said one communication.

9. In a load brake equipment having a member provided with two different control positions, and a fluid pressure system operative to effect an application of the brakes in accordance with the position of said member, in combination, an engine adapted to be shifted to one control position by fluid under pressure supplied through one communication and to another control position by fluid under pressure supplied through another communication, a strut cylinder mechanism operative in accordance with the loaded condition of the vehicle for controlling one of said communications and operative to open said communication when the degree of the load on the vehicle is less than a certain degree, a selector valve device controlling the other communication and operative to close said other communication upon the operation of said strut cylinder mechanism to open the first communication, a volume adapted to be charged with fluid under pressure, and valve means operative in initially charging the equipment for connecting the first communication with the fluid under pressure supplied to charge the system and operative upon a chosen increase in said pressure to connect said volume to the second communication.

10. In an empty and load brake equipment for a vehicle, in combination, a mechanism adapted to be positioned for providing a certain degree of braking and adapted to be differently positioned to produce a higher degree of braking, a change-over engine movable to one control position upon the supply of fluid under pressure to one chamber and to another control position upon the supply of fluid to another chamber for effecting the positioning of said mechanism, valve means normally establishing communication through which fluid under pressure is adapted to be supplied to one of said chambers and operative upon a chosen increase in the pressure of fluid supplied in initially charging the system to establish a different communication through which fluid under pressure is adapted to be supplied to the other chamber, and means controlled by the loaded condition of the vehicle for controlling one of said communications and operative to open said one communication only when the load on the vehicle is below a predetermined degree.

11. In a load brake equipment having a member provided with two different control positions, and a fluid pressure system operative to effect an application of the brakes in accordance with the position of said member, in combination, a brake pipe, an engine having two pistons of the same area movable to one control position upon the supply of fluid under pressure to one chamber and to another control position upon the supply of fluid to another chamber, valve means normally establishing communication through which fluid under pressure is adapted to be supplied to one of said chambers and operative upon a chosen increase in brake pipe pressure to establish a different communication through which fluid under pressure is adapted to be supplied to the other chamber, and means controlled by the loaded condition of the vehicle for controlling one of said communications and operative to open said one communication only when the load on the vehicle is below a predetermined degree.

12. In a load brake equipment having a member provided with two different control positions, and a fluid pressure system operative to effect an application of the brakes in accordance with the position of said member, in combination, a brake pipe, an engine having two pistons of the same area movable to one control position upon the supply of fluid under pressure to one chamber and to another control position upon the supply of fluid to another chamber, valve means normally establishing communication through which fluid under pressure is adapted to be supplied to one of said chambers and operative upon a chosen increase in brake pipe pressure to establish a different communication through which fluid under pressure is adapted to be supplied to the other chamber, selector valve means controlling the last mentioned communication, and a strut cylinder mechanism controlling the first named communication and operative and controlled by the loaded condition of the vehicle, said strut cylinder mechanism being operative when the load on the vehicle is less than a certain degree to open said first named communication and to effect operation of said selector valve to close the second communication, and operative when the load on the vehicle is more than said certain degree to close the first named communication and open the second named communication.

13. In an empty and load brake equipment for a vehicle, in combination, a mechanism adapted to be positioned for providing a certain degree of braking and adapted to be differently positioned to produce a higher degree of braking, a change-over engine movable to one control position upon the supply of fluid under pressure to one chamber and to another control position upon the supply of fluid to another chamber for effecting the positioning of said mechanism, valve means normally establishing communication through which fluid under pressure is adapted to be supplied to one of said chambers and operative upon a chosen increase in the pressure of fluid supplied in initially charging the system to establish a different communication through which fluid under pressure is adapted to be supplied to the other chamber, means for selectively controlling flow of fluid under pressure through said two mentioned communications dependent upon whether the vehicle is lightly or heavily loaded, and means automatically operative to vent fluid under pressure from either of said engine chambers following operation of the engine to either of its positions.

GEORGE K. NEWELL.